M. G. HUBBARD.
Metallic Washers.
No. 135,809. Patented Feb. 11, 1873.
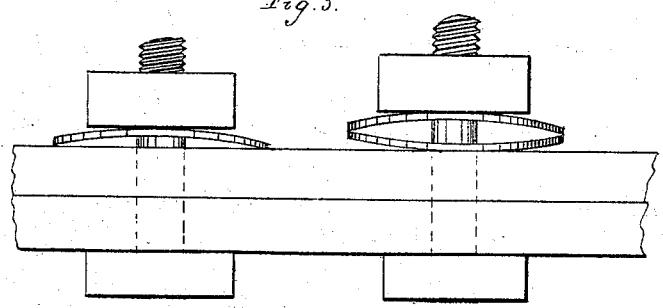
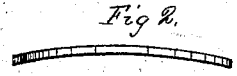
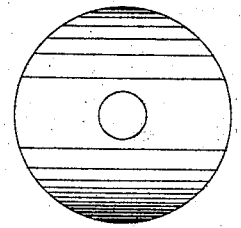
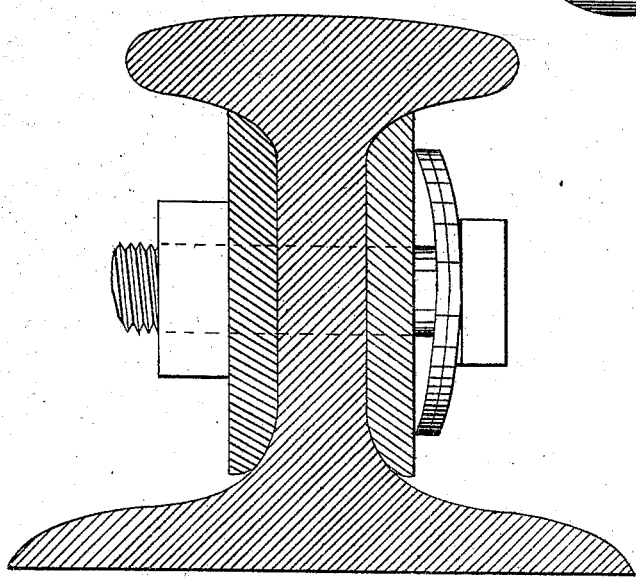

UNITED STATES PATENT OFFICE.

MOSES G. HUBBARD, OF SYRACUSE, NEW YORK.

IMPROVEMENT IN METALLIC WASHERS.

Specification forming part of Letters Patent No. 135,809, dated February 11, 1873.

*To all whom it may concern:*

Be it known that I, MOSES G. HUBBARD, of the city of Syracuse and State of New York, have invented certain new and useful Improvements in the Form, Construction, and Arrangement of Elastic Washers for preventing nuts from working loose on ordinary bolts; and that the following is a correct description thereof, reference being had to the accompanying drawing which forms part of this specification.

Figure 1 is a top view of my elastic washer, showing its round form. Fig. 2 is an edge view, showing its curve in one direction only. Figs. 3 and 4 show different arrangements thereof.

My washers should be made of sheet-steel, by punching them out in the ordinary way with a round punch and die, and then curve them in one direction only, as shown in Fig. 2; or, the sheets of steel may be formed into the proper curve, and the end of a round punch and face of the die made on the same curve.

My improvement consists in making an elastic washer, in the form and manner shown in Figs. 1 and 2, of sheet-steel, and then tempering them to give them sufficient elasticity and stiffness, and then arranging them as shown.

For many purposes the principal object of elastic washers would not be realized unless the elastic force or stiffness of the washers should be equal, or nearly equal, to the ordinary strain upon the bolts. By making these washers of sufficient thickness, or by placing a sufficient number of them on the same bolt, with their curves in the same direction, any desired amount of stiffness may be attained.

For many other purposes less stiffness and a greater range of spring are required. For such purposes, if their curves are placed in opposite directions alternately, any desired amount of elasticity or range of spring can be produced.

I make my elastic washers round, because they can be punched in that form out of sheet-steel (with a bolt-hole in the center) more cheaply in that form than any other, and also because in that form I get more elasticity and stiffness, with less liability to break, than in any other form.

I curve them in one direction only, because I thereby attain the highest perfection of elasticity, being that which results from contracting one surface and expanding the other surface of the steel.

It will be observed that, by making my elastic washers round and curving them in one direction only, I get nearly the action of a perfectly-proportioned tapered spring, thereby attaining the most favorable conditions for a successful tempered steel elastic washer—viz., the greatest possible degree of elasticity, stiffness, strength, and cheapness attainable in an elastic washer.

Having thus fully described my invention, what I claim as new, and desire to secure by Letters Patent, is—

The form and construction of the elastic washer, substantially as and for the purposes set forth.

M. G. HUBBARD.

Witnesses:
ALEXR. MAHON,
N. B. SMITH.